United States Patent [19]

Morrison

[11] Patent Number: 5,558,954
[45] Date of Patent: Sep. 24, 1996

[54] PREPARATION OF CARBON ELECTRODES BY POLYMER-PRECIPITATION

[75] Inventor: Robert L. Morrison, Modesto, Calif.

[73] Assignee: PolyStor Corporation, Dublin, Calif.

[21] Appl. No.: 322,563

[22] Filed: Oct. 13, 1994

[51] Int. Cl.$^6$ .................................................. H01M 4/04
[52] U.S. Cl. ..................... 429/218; 29/623.1; 423/447.4; 264/29.7
[58] Field of Search ........................ 429/218; 264/29.7; 29/623.1; 423/447.1, 447.4, 447.5

[56] References Cited

U.S. PATENT DOCUMENTS

| | | |
|---|---|---|
| 4,304,825 | 12/1981 | Basu . |
| 4,423,125 | 12/1983 | Basu . |
| 4,832,881 | 5/1989 | Arnold, Jr. et al. ................... 264/29.7 |
| 5,028,500 | 7/1991 | Fong et al. . |

OTHER PUBLICATIONS

"Textbook of Polymer Science," Billmeyer, Jr., 1962, 1971, pp. 38–47.

Meyer, Bill, Jr.; "Textbook of Polymer Science", 2nd., pp. 370–371;1971. (month N/A).

*Primary Examiner*—M. Nuzzolillo
*Attorney, Agent, or Firm*—Hickman Beyer & Weaver

[57] ABSTRACT

The present invention provides a method of preparing carbon electrodes for use in electrochemical energy storage cells such as lithium ion batteries. The process involves a step of precipitating a polymer from a concentrated solution to yield a structure having at least a partially fractious morphology. The solvent from which the polymer has been precipitated (the "primary solvent") is then exchanged with another solvent (the "secondary solvent") in which the polymer is relatively insoluble. Thereafter, the secondary solvent is removed from the precipitated polymer and the dry polymer is contacted with a dopant such as phosphorous. Subsequently, the polymer with dopant is pyrolyzed to yield a carbon material which is assembled into an electrode.

33 Claims, 3 Drawing Sheets

PREPARATION OF CARBON ELECTRODES BY POLYMER-PRECIPITATION

BACKGROUND OF THE INVENTION

The present invention relates to methods of preparing carbon-based electrodes for use in electrochemical energy storage devices. More particularly, the invention relates to methods that involve precipitating a polymer from solution, extracting solvent from the polymer, drying the polymer, and pyrolyzing the polymer to form a carbon material.

"Rocking chair" or "lithium-ion" batteries employ a carbon-based anode which intercalates lithium. All carbon rocking chair batteries include a carbon insertion anode, a high voltage insertion cathode, and a lithium ion (or sodium ion) conducting solution (e.g., liquid electrolyte with separator, solid ionically conducting electrolyte, solid polymer electrolyte, or gel polymer electrolyte). During charging, lithium (or sodium) ions from an electrolyte are taken up by the carbon anode (i.e., intercalated), and during discharging those same lithium ions are transported from the anode, through the electrolyte, into an insertion cathode. Properties which make such batteries attractive include (1) a high capacity per mass and volume, (2) a large voltage difference between the cathode and anode, and (3) a high stability at both very positive and very negative voltages. Various carbon-based materials have been proposed for use as the anode, but most of these materials have one or more disadvantages as discussed below.

U.S. Pat. No. 4,423,125 entitled "Ambient Temperature Rechargeable Battery", issued to Basu, describes battery including a lithium intercalated graphite anode and an organic electrolyte. Unfortunately, the described graphite anode is unsuitable for use with many desirable electrolytes (particularly propylene carbonate based electrolytes, and electrolytes having certain salts such as $LiClO_4$ and $LiPF_6$). It is believed that the solvents or salts of such electrolytes are inserted into the graphite ring planes, or interplanar regions, resulting in excessive structural stress, exfoliation of the material, and poor cycleability. In addition, lithium is believed to diffuse much slower in graphite than in less ordered carbons. Furthermore, the high quality, highly ordered synthetic graphite needed to ensure high intercalation levels and good cycleability can be difficult and costly to produce. This is because such materials must be produced by pyrolysis of organic compounds at rather high temperatures (>2500° C.), which adds to the cost of the material. Finally, suitable graphite precursors are limited to a relatively small number of organic molecules and polymers.

Partially-graphitic, less ordered, and amorphous carbon anodes have been proposed for use as lithium intercalation electrodes in U.S. Pat. No. 5,028,500 entitled "Carbonaceous Electrodes for Lithium Cells" and issued to Fong et al. That patent describes carbon anodes which contain (1) highly graphitized carbon, (2) substantially lower ordered carbon, or (3) both highly graphitized and less graphitized phases. In addition, the patent notes that carbon black may be used as an additive in some anodes.

To minimize an observed irreversible capacity loss (a parasitic process which decreases the cell's potential capacity), U.S. Pat. No. 5,028,500 specifies that the surface area of the carbon particles which make up the electrode should have a surface area of less than 10 $m^2$/gm, with the most preferable range being below 2 $m^2$/gm. Although carbon particles in this size range may be desirable for use in electrodes, the patent does not address the procedure by which they are formed from pyrolyzed carbon. Certain difficulties are inherent in many such procedures. For example, it can be difficult to produce carbon particles of a desired size range from coke or other conventional starting material. Further, when such materials are convened to particles, the process typically produces many reactive "fresh" surfaces which can be readily oxidized or otherwise reacted soon after they are exposed, thus degrading the carbon's ability to intercalate and increasing the irreversible capacity loss.

Two other types of carbon-based lithium intercalation electrode are proposed in U.S. Pat. No. 5,358,802 (U.S. Ser. No. 08/041,507, attorney docket no. IL-9060), issued on Oct. 25, 1994, entitled "Doping of Carbon Foams for Use in Energy Storage Devices," naming Mayer, Pekala, Morrison, and Kaschmitter as inventors, and incorporated herein by reference for all purposes. Specifically, this patent describes as suitable intercalation anodes (1) doped carbon foams formed from crosslinked, e.g., resorcinol/formaldehyde aquagels, and (2) doped carbon materials produced by thermally induced precipitation of polyacrylonitrile ("PAN") from dimethyl sulfoxide ("DMSO") solutions. While these materials, especially the second material, have an improved morphology, further improvements in their processing techniques would be desirable. For example, the doped carbon material from precipitated PAN has been prepared with an expensive freeze drying step.

Accordingly, there is a need for further improvement in carbon-based lithium intercalation electrodes and methods of manufacturing such electrodes.

SUMMARY OF THE INVENTION

The present invention provides a method of preparing carbon electrodes for use in electrochemical energy storage cells such as lithium ion batteries. The process includes a step of precipitating a polymer such as polyacrylonitrile from a concentrated solution to produce a structure having at least a partially fractious morphology. As used herein, the term "fractious" refers to a morphology having many fracture lines or gaps directed at various angles. It is believed that, on pyrolysis, such structure is generally retained and convened to easily fractured carbon materials having many small walls or sheet-like regions which ultimately form carbon particles for use in intercalation electrodes. Thus, the process steps of this invention are intended to provide and maintain a fractious microstructure associated with the precipitation of polymers from solution.

After a polymer has been precipitated, it still contains some solvent within its interstices. This may be the solvent from which it was precipitated (referred to herein as the "primary solvent") and/or another solvent (the "secondary solvent") in which the polymer is relatively insoluble and which may have been used to precipitate the polymer from the primary solvent. According to the process of this invention, any primary solvent remaining in the polymer is exchanged with the secondary solvent in a separate step. For example, if PAN is precipitated from a DMSO solution, water (as a secondary solvent) may be exchanged with the DMSO. After the primary solvent has been exchanged with the secondary solvent, the secondary solvent is removed from the precipitated polymer and then the dry polymer is subsequently pyrolyzed under conditions which yield a fractious carbon material. The overall process leading to this carbon material is relatively simple and inexpensive in comparison to prior methods that involve freeze drying. In especially preferred embodiments, the precipitation, solvent exchange, and drying steps are performed sequentially as pan of a continuous process.

After the carbon material has been produced by pyrolysis, it is preferably fractured into particles used to fabricate an electrode such as a lithium intercalation electrode for use in a battery or other electrochemical energy storage device. Preferably, the carbon material is ground to a powder and then combined with a binder and formed into an electrode of the desired size and shape.

One aspect of the present invention provides a method of preparing a carbon-based electrode which method includes the following steps: (a) precipitating a polymer from a primary solvent to give a polymer having at least a partially fractious morphology; (b) exchanging the primary solvent remaining in the precipitated polymer with a secondary solvent (the secondary solvent should be miscible with the primary solvent, and the polymer should be substantially insoluble in a solution of the primary and secondary solvents); (c) removing the secondary solvent from the precipitated polymer; (d) pyrolyzing the precipitated polymer to convert the polymer to a fractious carbon material; and (e) fabricating the carbon-based electrode from the carbon material. The step of precipitating the polymer is preferably conducted by contacting the polymer solution with the secondary solvent.

Examples of suitable polymers for use in this invention include polyacrylonitrile, polymethylacrylonitrile, polyfurfuryl alcohol, polyfurfuryl, phenolic resins, polydivinyl benzene, polyacrylates, polyvinyl chloride, polyimide and copolymers of various ethylenic monomers. Examples of suitable primary solvents for use in this invention include dimethyl sulfoxide, dimethylformamide, maleic anhydride, propylene carbonate, ethylene carbonate, and dimethylacetamide. In an especially preferred embodiment, the polymer employed in the step of precipitating the polymer is polyacrylonitrile or polymethylacrylonitrile (or combinations thereof) and the primary solvent is dimethyl sulfoxide or dimethylformamide.

In preferred embodiments, the step of pyrolyzing the precipitated polymer is conducted at a temperature of between about 600° and 1200° C. to produce a carbon material having a desired solid state structure. In especially preferred embodiments, the carbon material produced by this method includes a dopant. In these embodiments, the process includes a step of doping the precipitated polymer before the step of pyrolyzing. Typically, the step of doping is conducted by contacting the precipitated polymer with a dopant material that includes one or more of the following: phosphorous, boron, arsenic, antimony, and precursors thereof (e.g., phosphoric acid or phosphorous pentoxide).

These and other features of the present invention will be presented in more detail in the following specification of the invention and in the figures.

DESCRIPTION OF THE PREFERRED EMBODIMENTS

Figure 1:
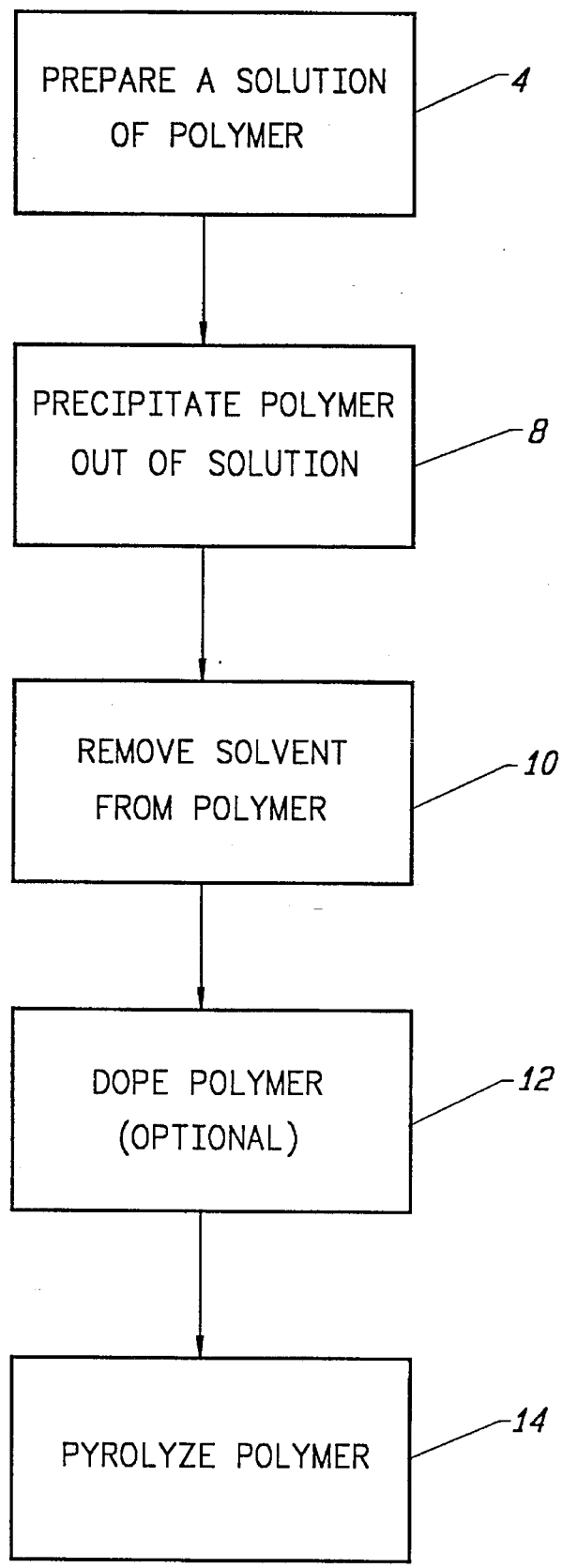
FIG. 1 is a process flow diagram of the procedure used to make carbon anodes according to the present invention.

Referring now to FIG. 1, a general flow diagram for the process of this invention is provided. The process begins in a step 4 where a concentrated solution of a specified polymer is prepared. Thereafter, at a step 8, the polymer is precipitated out of the solution by one of two techniques which will be described in more detail below. For now, it should be recognized that these techniques am termed (1) thermally induced phase separation ("TIPS"), and (2) chemically induced phase separation ("CIPS"). In either procedure, the precipitated polymer should have a fractious morphology. It is important that throughout the remainder of the process, this morphology be generally preserved. After the polymer has been precipitated at step 8, the solvent is removed from the polymer by one of various methods described below at a step 10. Next, the polymer is optionally doped with an element of valence IH or valence V. Finally, at a step 14, the precipitated (and optionally doped) polymer is pyrolyzed at a temperature chosen to give a desired solid state structure (usually having some degree of graphitic component). The resulting carbon material can be used to fabricate an intercalation electrode as described below.

The polymer solution prepared in step 4 is, most generally, any carbon-based polymer for which there is an appropriate primary solvent in which it is highly soluble. Preferably, the polymer is chosen so that it yields a high percentage of carbon on pyrolysis, a feature sometimes quantified in terms of a "char fraction." The char fraction of a given polymer is influenced by a variety of factors based upon the structure of the polymer. For example, it is known that some ethylenic polymers having alpha hydrogens (e.g., PAN) provide high char fractions. See Billmeyer, Jr., "Text book of Polymer Science," 2d. Ed., John Wiley & Sons (1971) pp. 370–371, which is incorporated herein by reference for all purposes.

As noted, the polymer should be chosen with a primary solvent in mind, such that the polymer-primary solvent combination provides a solution having a high weight fraction of polymer. This permits minimal processing of the solvent in later steps. Generally, solutions having polymer concentrations at least 3 weight percent (and more preferably at least 15 weight percent) are suitable. A non-exclusive list of suitable polymers includes the following: polyacrylonitrile ("PAN"), polymethylacrylonitrile ("PMAN"), polyfurfuryl alcohol, polyfurfuryl, phenolic resins, polydivinyl benzene, polyvinyl chloride, polyacrylates, polyimides, and copolymers of ethylenic monomers. Suitable solvents for use with this invention may include (depending on the polymer) dimethyl sulfoxide ("DMSO"), dimethylformamide ("DMF"), maleic anhydride, propylene carbonate, ethylene carbonate, and dimethylacetamide. In particularly preferred embodiments, the polymer is PAN and the primary solvent is DMSO, although DMF and polycarbonate are also suitable primary solvents for use with PAN. In another preferred embodiment, the polymer is PMAN and the solvent is DMF or DMSO.

Generally, the polymer solution should be prepared under conditions that allow the greatest amount of polymer to dissolve in solution. It has been found that a good dissolution procedure for PAN in DMSO involves adding PAN powder (or particles) to strongly agitated DMSO held at a temperature of no more than about room temperature. The DMSO is preferably agitated to the point of forming a vortex. After the polymer particles have been added, they are dissolved by increasing the temperature of the DMSO. This may require heating the solution to a temperature as high as the solvent's boiling point (e.g., 189° C. for pure DMSO) or decomposition point, which ever is lower. In addition, the solution temperature should be kept below the melting point of the polymer. For many DMSO based systems, the solution temperature is preferably between about 100° C. and the boiling point of DMSO.

As mentioned, the polymer may be precipitated from solution by either thermally or chemically induced phase separation. Thermally induced separation will be discussed first. In this approach, the polymer-solvent solution is thinly spread over a tray or other flat surface. The actual thickness of the solution will vary depending upon the thermal conductivity of the solution. Generally, the solution should be made thin enough that the entire solution rapidly attains a uniform temperature during cooling. For a concentrated solution of PAN in DMSO, it has been found that the solution is preferably spread to a thickness of less than about 5 millimeters. In alternative embodiments, the solution may be provided as a thin thread or other structure, provided that the primary dimension (e.g., thickness or diameter) is relatively small with respect to the thermal conductivity of the solution.

After the polymer solution has been spread or drawn to an appropriate thickness, it is then cooled until precipitation occurs, commonly observed by a change in opacity, color, or other indicator associated with a phase transition. For example, a PAN-DMSO solution will change from colorless or transparent yellow to opaque upon precipitation of the PAN. In some embodiments, the solution will be cooled to a point below the freezing point of the pure solvent, and sometimes to the freezing point of the solution. By way of example, the freezing point of DMSO is 18.4° C., while the solution is preferably cooled to between about 5° C. and −150° C. depending on the desired morphology. The cooling temperature and rate of cooling affect the morphology of the precipitated polymer. At lower temperatures, the characteristic dimensions of the fractious structure is reduced.

In a chemically induced phase separation ("CIPS") process, precipitation is induced by adding a secondary solvent to a polymer solution. In general, a secondary solvent should be chosen which is miscible with the primary solvent, and has a very low solubility for the dissolved polymer. More precisely, the ternary system (including the primary and secondary solvents as well as the polymer) should have a two phase region (where the polymer is insoluble) for relatively low concentrations of the secondary solvent. In the preferred polymer solutions described above (e.g., DMSO-PAN and DMF-PMAN), a preferred secondary solvent is water. However, various ketones, alcohols, and other polar solvents are also acceptable. For example, suitable solvents include acetone, ethanol, methyl ethyl ketone, isopropanol, methanol, and combinations of these with each other or water. It should be borne in mind that such secondary solvents are appropriate for primary solvents such as DMSO and DMF. Other primary solvents may require different secondary solvents. For example, if the polymer is soluble in water or acetone, the above listed primary and secondary solvents may have to be reversed (e.g., water could be used as a primary solvent and DMF could be used as a secondary solvent).

In especially preferred embodiments, the primary and secondary solvents should—in addition to the above criteria—have widely different vapor pressures to facilitate easy separation by, e.g. distillation. An exemplary combination of primary and secondary solvents which have such divergent vapor pressures include water and DMSO.

It should be noted that CIPS precipitations preferably involve cooling the polymer solution to a relatively low temperature (e.g., below about 40° C.) before the secondary solvent is added. This is to minimize evaporation of the solvent during processing. At the high temperatures used to prepare concentrated polymer solutions, substantial solvent evaporation may occur at the surface of the solution. In addition to the obvious dangers associated with solvent vapors, evaporation also results in a locally increased polymer concentration which may be manifest as a polymer skin. Such skin may hinder the mass transfer of the secondary solvent into the polymer-primary solvent solution, and thus prevent complete and consistent precipitation of the polymer. The temperature to which a polymer solution should be cooled before CIPS depends, of course, upon the vapor pressure of the solvent in the polymer solution. For the DMSO-PAN system, it has been found that the solution may be cooled to a temperature of between about 20°–60° C. and more preferably between about 30°–40° C.

Figure 2A:
FIG. 2a is a scanning electron micrograph of a precipitated polymer structure prepared in accordance with this invention.
Figure 2B:
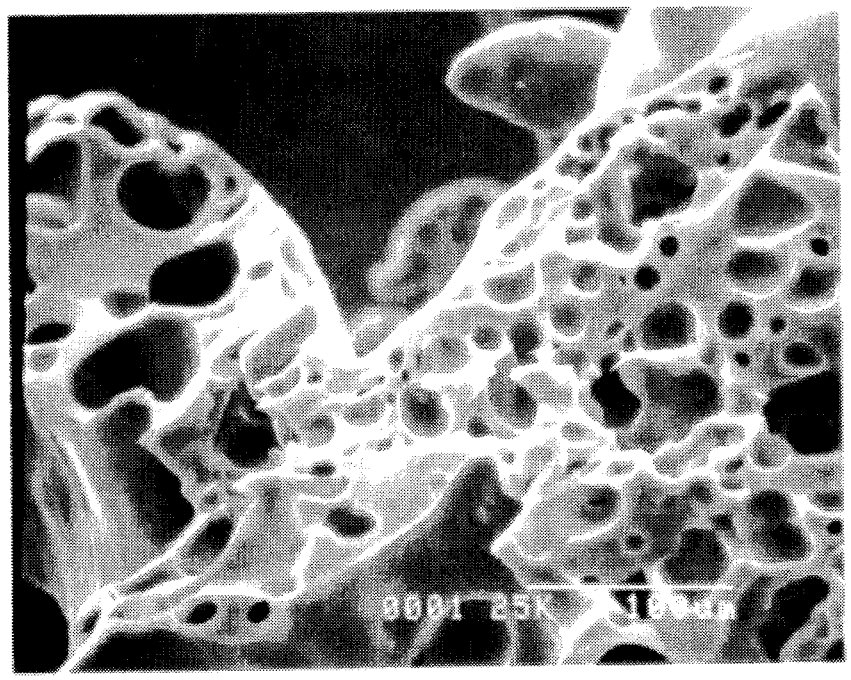
FIG. 2b is a scanning electron micrograph of a carbon structure prepared in accordance with this invention.

Depending upon the chosen precipitation conditions, solvents, and polymers, the precipitated polymer's morphology can vary. For example, by adjusting the polymer solution concentration, the choice of primary and secondary solvents, and the amount of agitation within the precipitation solution, the density of the material and the size and shape of the microstructures in the material can be controlled. In general, the precipitated polymers of this invention will have at least some fractious component. As mentioned, the term "fractious" refers to a morphology having many fracture lines or gaps directed at various angles. Generally, such fracture lines will define walls or sheet-like structures (usually having some curvature) with a primary dimension (diameter or edge) in the range of between about 10 and 100 micrometers. A scanning electron micrograph of a polymer precipitate (PAN precipitated from DMSO by the addition of water) having such "fractious" morphology is shown in FIG. 2a. The magnification is 300×. As can be seen, gaps in the structure define sheet-like structures having dimensions on the order of 10–100 micrometers. On pyrolysis, the fractious morphology is generally preserved, albeit slightly modified, in the corresponding carbon structure. A scanning electron micrograph of the carbon structure (prepared from the precipitated material shown in FIG. 2a) is presented in FIG. 2b. Again the magnification is 300×. This material has more of a "Swiss cheese" structure, but retains gaps on the order of 10–100 micrometers.

It is believed that the microstructure provided by precipitation is maintained, on pyrolysis, and the resulting carbon structure includes many easily fracturable and randomly oriented planes (sheet-like structures). Such material is converted with relative ease to carbon particles (by e.g. an attrition mill or a ball mill) for use in electrodes such as lithium intercalation anodes. Conventional coke or other pyrolysis products, on the other hand, generally do not have the fractious structure found in carbon materials prepared in accordance with this invention. Such conventional products are thus somewhat difficult to reduce to particles and form into electrodes. Further, as is known to those of skill in the art, freshly broken carbon surfaces (as opposed to surfaces formed by cleaving along fracture lines) are reactive and easily oxidized. The carbon materials produced in accordance with the process of this invention will be less susceptible to this problem because, it is believed, that they break along fracture lines and therefore form relatively few new surfaces.

Depending upon whether the process is conducted continuously or in batch and upon how the electrode is to fabricated, the polymer can be precipitated with or without a support. Suitable supports may include carbon fiber cloths, metallic fiber cloths, metal foils, etc. In one embodiment, two sheets of precipitated polymer on carbon fiber supports are fused to opposite sides of a metal current collector (Such as an expanded metal screen or "Exmet"™). In continuous processes, the polymer may be precipitated onto a temporary support such as a flexible sheet of metal foil, mylar, etc. which can be separated from the precipitated polymer after that polymer becomes sufficiently strong to support itself. Generally if the support is to remain attached to the polymer through pyrolysis, it should be flexible (as, e.g., a cloth) because the polymer will shrink during pyrolysis.

The process of removing the solvent from the polymer pores (step 10 of FIG. 1) typically involves solvent exchange and drying steps. In preferred embodiments, the primary solvent is extracted by contact with the secondary solvent and subsequent evaporation of the secondary solvent from the polymer by heating or other appropriate process. As will be described below, it is often convenient to use a series baths having successively higher concentrations of the secondary solvent to replace the primary solvent before drying. For example, in a CIPS process, an initial precipitation bath might have a concentration of 20% water and 80% DMSO. A second bath might have a concentration of 50% water and 50% DMSO, and a final bath might have a concentration of 75% water and 25% DMSO. With a TIPS process, of course, the secondary solvent is not used to precipitate the polymer. However, it is desirable in TIPS to replace the primary solvent with another liquid which can easily be evaporated before drying. Generally, such liquid should have a very low solubility for the polymer (as in the CIPS system). Thus, the same combinations of primary and secondary solvents may be used for TIPS and CIPS.

After the primary solvent has been exchanged, the polymer may be dried by any of a variety of inexpensive techniques such as simple evaporation under ambient conditions or drying in an infrared dryer. Alternatively, the solvent may be at least partially removed by a mechanical technique such as centrifugation. In some embodiments, the separation will include a combination of mechanical and evaporative drying steps.

It should be noted that it is typically unnecessary to completely exchange the primary solvent with the secondary solvent. For the preferred method employing PAN-DMSO, only a very small amount of secondary solvent (e.g., water) is required for complete precipitation in CIPS. After such precipitation, the primary and secondary solvents may be removed together, at the same time. However, as explained below, substantial solvent exchange may be desirable in continuous processes.

At some point during the process, the precipitated polymer is optionally doped with a dopant element or, more preferably, a precursor of the dopant element (i.e., a compound that decomposes to give the desired dopant atom during pyrolysis). Doping in the context of this patent refers to donor or acceptor dopants which are "permanently" integrated into the carbon matrix, as opposed to intercalate doping which involves "reversible" intercalation of lithium ions into carbon. The selected dopants can alter the binding energy for intercalated ions and hence improve the energy density when used in an electrode in a rechargeable battery.

Preferably the donor or acceptor dopants are selected to be from group IIIA (for acceptors) or from group VIA (for donor materials) of the periodic chart. Thus, suitable acceptor dopants are boron, aluminum, gallium, indium, and thallium, and suitable donor dopants include phosphorous, arsenic, antimony, and bismuth. In some cases, dopant atoms from other groups may be appropriate, such as, for example, sulfur. In particularly preferred embodiments, the dopant is phosphorous, boron, arsenic, or antimony.

Often the dopant will be provided in the process of this invention as a precursor of the ultimate dopant atom that is to be incorporated into the carbon matrix. For example, when the dopant is phosphorous it may be provided as one of the phosphorous precursors such as phosphoric acid, phosphorous pentoxide, or a phosphate salt. During pyrolysis, these compounds are decomposed to yield phosphorous atoms which are incorporated into the carbon solid phase. In one preferred embodiment, the dopant is provided as a solution of about 0.1 to 5 percent phosphoric acid by weight in water, a ketone, or an alcohol. Preferably, the phosphoric acid is dissolved in acetone or methanol.

The dopant may be added to the precipitated polymer in a separate step as shown at step 12 of FIG. 1 or as part of the extraction step shown at step 10 of FIG. 1. In the latter case, the dopant or dopant precursor is added to the extraction solvent (secondary solvent) so that it contacts the precipitated polymer and remains on the polymer surface during the drying step. For example, if PAN is precipitated from DMSO by a chemically induced phase separation process, the DMSO may be exchanged with water or methanol containing dissolved phosphoric acid at a concentration of about 0.1–5 percent by weight. When the polymer is subsequently dried by evaporating the secondary solvent, an ortho-phosphoric acid residue will remain on the polymer surface. During subsequent pyrolysis (step 14 of FIG. 1), the phosphoric acid will decompose leaving phosphorus atoms which diffuse into the bulk polymer providing a phosphorous-doped carbon electrode material. In general, the dopant material should be provided in a solvent or other carrier which does not dissolve the precipitated polymer. It has been found that dopants (especially phosphorous) are readily incorporated in the fractious materials produced in accordance with the methods of this invention.

Of course, when the dopant is provided with the secondary solvent (during precipitation or solvent exchange), most or nearly all of the primary solvent should be exchanged with the secondary solvent in order to ensure thorough doping. To the extent that less of the primary solvent is exchanged, more concentrated solutions of the secondary solvent will be required.

In the last step shown in FIG. 1, the polymer is pyrolyzed (step 14) to produce the carbon material for use as an electrode in an electrochemical device. In general, the pyrolysis may be performed under any condition which yields a substantially pure carbon material. However, in preferred embodiments, the pyrolysis is performed at a temperature of between about 500° and 1200° C. More preferably, the pyrolysis is conducted at temperature of about 1000° and 1150° C., and most preferably at about 1050° C. In these temperature ranges, the resulting carbon material will not be highly graphitic. As mentioned, such structures are preferred to relatively pure graphitic structures which provide electrodes suffering from poor cycle life and the other abovementioned problems. However, it is within the scope of this invention to produce pure or relatively highly pure graphitic electrode materials. Such materials can be readily produced at pyrolysis temperatures of greater than about 2300° C. In general, the thermal decomposition of organic compounds to form carbon results in carbons with varying degrees of crystallinity, ranging from highly amorphous glassy carbon to highly ordered pyrolytic graphite.

Generally, pyrolysis is conducted in a vacuum or inert atmosphere of nitrogen, argon, neon, or helium in a retort furnace. In a particularly preferred embodiment, the pyrolysis is conducted under flowing nitrogen to maintain a positive pressure in the pyrolysis chamber.

The carbon material resulting after pyrolysis can be formed into an electrode by various techniques. In one of the simplest techniques, the carbon will have been formed on a metal support which acts as a current collector for the completed electrode. The resulting structure is simply sized for use in an electrochemical cell and, optionally, formatted or preprocessed in another manner to provide the desired physical-chemical properties of an electrode. Such procedures are well known to those in the skill of the art. In some preferred embodiments, the carbon material resulting form pyrolysis is ground, combined with a binder and spread onto current collector to form an electrode. In one specific embodiment, the carbon pyrolysis product is converted to particles by attrition or ball milling. Thereafter, the particles are sieved to yield particles of 2 to 60 micrometers in diameter. These are then combined with a 10% solution of polyvinylidene difluoride (binder) in DMF and the resulting combination is then attached to a copper foil substrate with one or more roller press steps. The bindercarbon material is subsequently evaporated and then heated to melt the polyvinylidene difluoride. After the intercalation anode has been prepared, it is provided in a lithium cell which may employ many different types of components (each of which is within the scope of this invention).

An organic electrolyte for use in the cell may include any of various acceptable compounds and salts. Suitable organic electrolytes for use in intercalation cells include one or more of the following: propylene carbonate, ethylene carbonate, 1,2-dimethoxyethane, 1,2-diethoxyethane, γ-butyrolactone, tetrahydrofuran, 2-methyltetrahydrofuran, 1,3-dioxolan, 4-methyl 1,3-dioxolan, diethyl ether, sulfolane, acetonitrile, propionitrile, dimethyl carbonate, diethyl carbonate, anisole, and mixtures or combinations thereof. Suitable electrolyte salts include one or more of the following: bis-trifluoromethane sulfonimide ("HQ115" available from 3M of Minnesota) $LiAsF_6$, $LiPF_6$, $LiBF_4$, $LiB(C_6H_5)_4$, LiCl, LiBr, $CH_3SO_3Li$, and $CF_3SO_3Li$. In a preferred embodiment, the electrolyte includes a mixture of propylene carbonate, 1M HQ115, and 0.1M $LiAsF_6$.

Suitable cathode materials will also be known to those of skill in the an and include, by way of example, lithium molybdenum sulfides, lithium molybdenum oxides, lithium vanadium oxides, lithium chromium oxides, lithium titanium oxides, lithium tungsten oxides, lithium cobalt oxides, lithium nickel oxides, and lithium manganese oxides.

Figure 3:
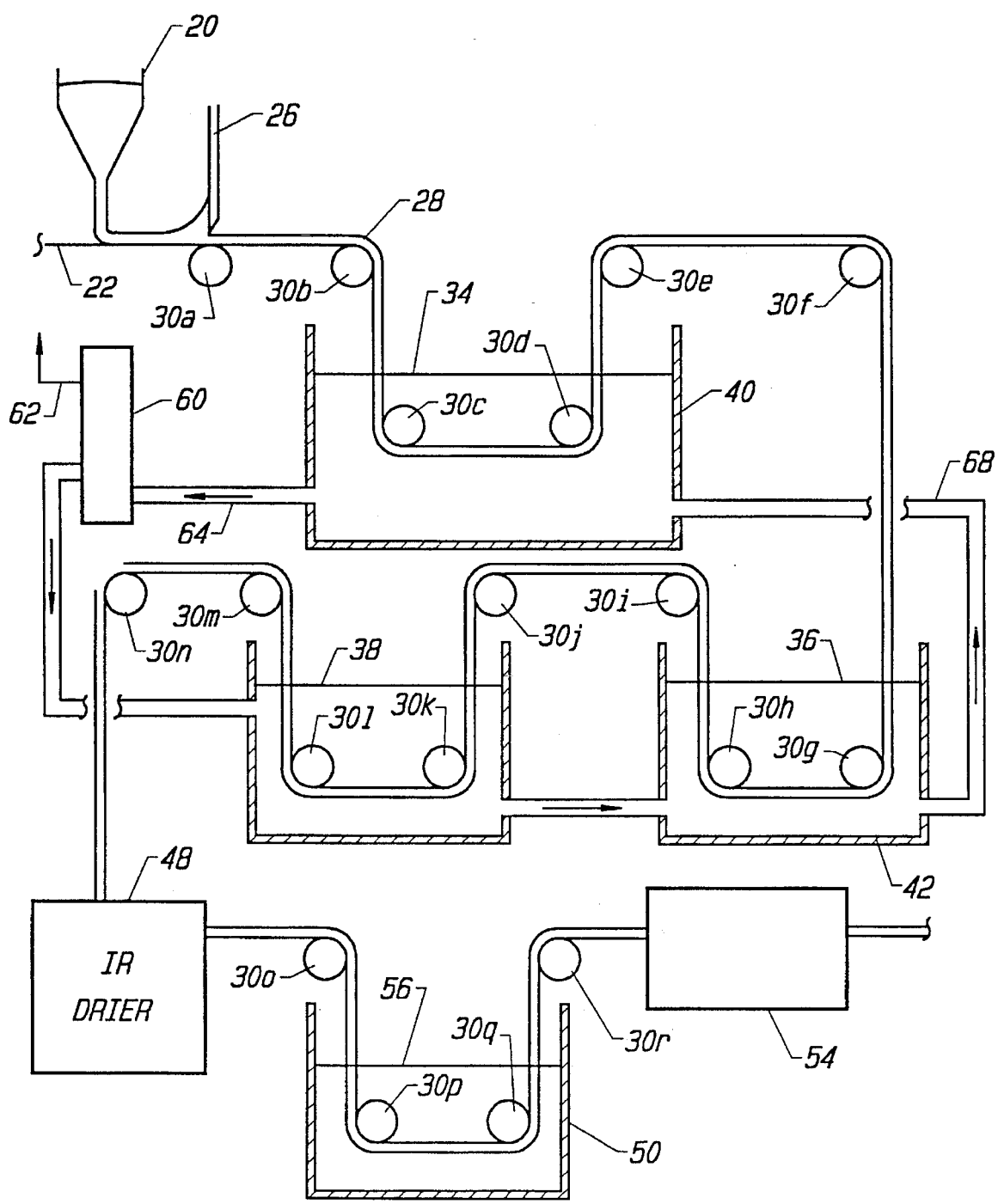
FIG. 3 is a schematic drawing of apparatus used to continuously prepare a sheet of polymer in accordance with the present invention.

A continuous process for preparing sheets of precipitated polymer will now be described with reference to FIG. 3. As shown in FIG. 3, a hopper 20 dispenses a sheet of polymer solution 28 at a suitable concentration and temperature as described above. The polymer solution is deposited on a moving carrier sheet 22 which passes under knife 26 to produce a thin evenly spread layer of polymer solution 28 on carrier 22. The lower tip of knife 26 and the carrier 22 should be spaced such that the thickness of polymer solution 28 has a thickness complying with the primary dimension constraints described above (e.g., about 5 mm thick for concentrated PAN-DMSO solutions). That is, the polymer solution 28 should be spread sufficiently thin that mass transfer is fast enough to allow a continuous sheet of precipitated polymer to form during chemically induced phase separation.

The carrier 22 sheet—which moved along in the continuous process by rollers 30a, 30b, 30c, 30d, 30e, etc.—may be made from a variety of suitable materials including mylar. In addition, the carrier may be a material that is intended to be incorporated in the ultimately produced electrode. For example, the carrier may include a metal foil or screen that is to form a current collector in the final electrode.

The carrier 22 with polymer solution 28 is directed into precipitation tank 40 containing a precipitation solution 34 including a secondary solvent. In a preferred embodiment, the primary solvent is DMSO, the secondary solvent is water, and the polymer is PAN. Solution 34 includes, by way of example, about 80% DMSO and about 20% water. Upon entering solution 34, the polymer in solution 28 precipitates out of solution by a chemically induced phase separation process. The carrier and precipitated polymer are then transported out of precipitation tank 40 via roller 30e.

From tank 40, the carrier and precipitated solvent sheet enters (via rollers 30f, 30g, and 30h) second tank 42 containing a solution 36 of between about 50% DMSO and about 50% water, for example. In this tank, some of the DMSO in the precipitated polymers pores is replaced with water for example. However, some fraction of the DMSO will remain in the polymer pores. To remove much of the remaining DMSO, the carrier and precipitated polymer is directed (via rollers 30i, 30k, and 30l) into a third tank 44 including a solution 38. Preferably, solution 38 includes between about 20% DMSO and about 80% water, for example. By passing the polymer sheet through this solution, the DMSO is substantially extracted from the polymer pores, the polymer is ready for drying.

Next, the polymer sheet is passed (via rollers 30m and 30n) through an IR dryer 48 operated at a temperature sufficient to remove the water and any residual DMSO from the polymer pores. The dry polymer and carrier are then passed (via rollers 30o, 30p, and 30q) through a tank 50 including doping solution 56. Preferably, the doping solution includes between about 0.1 and 5 weight percent phosphoric acid in acetone. As explained above, the doping step may alternatively be accomplished during solvent exchange such as in tanks 44 and 42. In the embodiment shown in FIG. 3, the precipitated polymer, impregnated with doping solution, is passed from tank 50 (via rollers 30r) to a dryer 54 were the doping solution solvent is evaporated leaving a residue of phosphoric acid on the precipitated polymer surface. Thereafter, the precipitated polymer sheet (and possibly carrier 22) is collected for further processing including pyrolysis.

The carrier sheet 22 may be removed at various stages in the above-described process—depending upon when the precipitated polymer has attained sufficient tensile strength to remain intact during subsequent processing. If the carrier is not to form part of the electrode, it is generally preferable to remove the carrier at earlier stages in the process. This allows subsequent steps, e.g., solvent exchange, drying, and doping, to be conducted more efficiently because the solvents or atmospheres employed in those steps will contact the precipitated polymer on two slides. In some embodiments, the precipitated polymer will attain sufficient structural integrity after immersion in bath 34 to allow the carrier 22 to be separated from the precipitated polymer immediately after leaving bath 34. The separation can then be accomplished by providing separate uptake reels for carrier 22 (near tank 40) and for the precipitated polymer sheet (at the end of the process after leaving driver 54). In alternative embodiments, it may be necessary to separate the carrier from the precipitated polymer later in the process, such as after processing in solvent exchange tanks 42 and 44 or drying in drier 48. Of course, if the carrier 22 is a current collector or is otherwise intended to be part of the electrode, no separation is necessary, and the carrier/polymer laminate is taken up on reel 60.

In preferred embodiments, the precipitation solution 34 in tank 40 is continuously directed via conduit 64 to a separator 60—which may be a distillation column—where the DMSO and water are separated. The separated DMSO is directed out path 62 which may, optionally, be used to prepare fresh polymer solution 28. The polymer solution so formed ultimately yields some of its DMSO to precipitation solution 34 when polymer solution sheet 28 is directed into tank 40. The water separated by separator 60 is directed via conduit 70 to tank 44 where it replenishes the concentrated water solution 38. To maintain the appropriate solution concentrations in tanks 40 and 42, a stream of solution 38 is constantly delivered to tank 42 via conduit 66 and a stream of solution 36 is constantly delivered to tank 40 via conduit 68. The solution mass flow rates to separator 60 and tanks 40, 42, and 44 are controlled so that the desired concentrations of solutions 34, 36, and 38 are maintained.

EXAMPLE 1

The following examples demonstrate application of the present invention in a batch process. In preparation to produce an electrode, a carbon mat approximately 5 mils thick was cut into sheets of the size of the battery to be fabricated. In this example, the sheets were cut into 2.5" by 3" rectangles. One of the pieces of carbon mat was placed onto a copper plate, which acted as a mechanical carrier during processing. A copper screen current collector, which is one inch larger than the carbon fiber mats (in each dimension), was centered on top of the carbon mat. A second carbon mat, identical to the bottom (first) carbon mat, was then placed on top of the copper screen.

24 grams of PAN was dissolved in 200 cc of DMSO. Dissolution was accomplished with continuous stirring to both facilitate the dissolution and to prevent the PAN from decomposing on the bottom of the beaker. This solution process took about 1 to 1.5 hours, at approximately 160° C. The hot PAN solution was then cooled to between 30° C. and 40° C. and poured onto the carbon/copper assembly. A threaded rod (somewhat longer than the above electrode assembly) was then used to spread a uniform amount of solution across the carbon/copper assembly.

When the carbon/copper assembly had been saturated with PAN solution, it was submerged (together with the copper plate) in pure water at ambient temperature to cause the PAN to precipitate. The carbon/copper assembly was then removed from the copper plate, and submerged in a water bath to insure the completion of the precipitation process. Approximately all of the PAN in the solution was precipitated in less than five minutes of submersion. The part was then dried and the carbon/copper assembly was submerged in a phosphoric acid solution prepared by adding about 1 gram phosphoric acid (85% in water) to 100 cc of water. The resultant carbon/copper assembly was then dried in warm air for one hour. Subsequently, the carbon/copper assembly was pyrolyzed at 1050° C. in nitrogen.

EXAMPLE 2

In other examples, the above procedure was followed with the following modifications. First, in some experiments, the step of doping with a phosphoric acid solution was eliminated all together. Obviously, the electrodes produced by this approach will not have dopant incorporated therein.

EXAMPLE 3

In another example, the carbon/copper assembly which had been saturated with PAN/DMSO solution was submerged in a phosphoric acid solution prepared as described in the first example. This produced a precipitated polymer that immediately included a phosphoric acid doping residue. In this approach, the precipitation and doping steps were combined into a single step.

EXAMPLE 4

In still other examples, precipitation was caused by TIPS. In one such example, a PAN/DMSO solution and a carbon mat/copper screen sandwich were prepared as described in the first example. A portion of the PAN/DMSO solution (at 20°–40° C.) was poured on the carbon mat/copper sandwich which was resting on a copper plate. Within several seconds a glass plate was placed on top of the sandwich and pressed down in order to limit the total thickness of the resulting electrode. Next, the copper plate assembly was placed into an ethanol bath held at −70° C. to freeze the PAN solution.

The PAN solution froze solid in about one minute. Thereafter, the glass plate was pried off with a spatula and the PAN sandwich scraped off the copper plate. The excess PAN which extended beyond the edges of the carbon fiber/copper screen sandwich was trimmed away.

Next, the frozen part was submerged in an acetone bath to exchange the DMSO with acetone. The temperature of the acetone bath was maintained at 12° C. in order that the PAN solution remained frozen during the solvent exchange procedure. The initial solvent exchange was conducted by holding the frozen PAN part in a fresh acetone bath for two hours or longer. Thereafter, the same procedure was repeated two more times, each time with a fresh acetone bath. When the last immersion in an acetone bath was complete, the assembly was air dried while held between flat stainless steel screens to prevent the part from curling. The dried part was then treated with a phosphoric acid solution as described in the first example. Thereafter, the phosphoric acid wetted part was air dried while being pressed between flat stainless steel screens.

Although the foregoing invention has been described in some detail for purposes of clarity of understanding, it will be apparent that certain changes and modifications may be practiced within the scope of the appended claims. For instance, although the specification has primarily described a process for preparing electrodes for use in batteries, the carbon material produced by the disclosed process may have other applications as well. For example, double layer capacitors and fuel cells may also employ the electrodes of this invention. Further, while the specification has described processes in which dopants are added to the polymer before pyrolysis, this is by no means necessary, as the dopants may be incorporated in the carbon material after partial pyrolysis. Still further, the carbon products of this invention may have non-electrochemical applications such as in water purifiers or specialized filters and separators. In addition, the reader will understand that the polymers described herein can in some cases be replaced with other high molecular-weight organic materials having high char fractions.

What is claimed is:

1. A method of preparing a carbon-based electrode for an electrochemical energy storage cell, the method comprising the following steps:

precipitating a polymer from a solution of the polymer in a primary solvent, the precipitated polymer having a fractious morphology;

exchanging the primary solvent in the precipitated polymer with a secondary solvent, wherein the secondary solvent is miscible in the primary solvent, and wherein the polymer is substantially insoluble in a solution of the primary and secondary solvents;

removing the secondary solvent, while in liquid phase, from the precipitated polymer;

pyrolyzing the precipitated polymer to convert the polymer to a carbon material having the fractious morphology; and fabricating said carbon-based electrode from the carbon material.

2. The method of claim 1 wherein the polymer employed in the step of precipitating a polymer is selected from the group consisting of polyacrylonitrile, polymethylacrylonitrile, and copolymers including these polymers.

3. The method of claim 1 wherein the primary solvent employed in the step of precipitating a polymer is selected from a group consisting of dimethyl sulfoxide, dimethylformamide, and combinations thereof.

4. The method of claim 1 wherein the step of precipitating a dissolved polymer involves precipitating the polymer from a solution containing at least about 15 weight percent polymer.

5. The method of claim 1 wherein the step of precipitating a polymer is performed by lowering the temperature of the solution to at least a point where precipitation occurs.

6. The method of claim 5 wherein, in the step of lowering the temperature of the solution, the temperature of the solution is lowered to at least the freezing point of the solution.

7. The method of claim 1 wherein the step of precipitating a polymer is performed by contacting the solution with said secondary solvent.

8. The method of claim 1 wherein the primary solvent is dimethyl formamide or dimethyl sulfoxide and the secondary solvent is water, ethanol, methanol, acetone, methyl ethyl ketone, or combinations thereof.

9. The method of claim 1 wherein the step of removing the secondary solvent from the precipitated polymer includes a step of drying the polymer to remove the solvent.

10. The method of claim 1 wherein the step of pyrolyzing the precipitated polymer is conducted at a temperature of between about 500° C. to 2500° C.

11. The method of claim 10 wherein the step of pyrolyzing the precipitated polymer is conducted at a temperature of between about 600° and 1200° C.

12. The method of claim 1 further comprising a step of doping the precipitated polymer before the step of pyrolyzing, the step of doping including contacting the precipitated polymer with a phosphorous precursor.

13. The method of claim 12 wherein the step of doping is conducted by contacting the precipitated polymer with a solution including the phosphorous precursor and said secondary solvent.

14. The method of claim 12 wherein the step of doping includes the following steps:

(a) immersing the precipitated polymer in a solution of said phosphorous precursor after the step of removing the secondary solvent from the precipitated polymer; and (b) drying the polymer.

15. A method of preparing a carbon-based electrode for an electrochemical energy storage cell, the method comprising the following steps:

contacting a solution of a polymer in a primary solvent with a secondary solvent to cause the polymer to precipitate out of the solution to form a precipitated polymer having a fractious morphology, wherein the secondary solvent is miscible in the primary solvent, and wherein the polymer is substantially insoluble in a solution of the primary and secondary solvents;

exchanging the primary solvent in the precipitated polymer with the secondary solvent;

removing the secondary solvent, while in liquid phase, from the precipitated polymer;

pyrolyzing the precipitated polymer to convert the polymer to a carbon material having the fractious morphology; and fabricating said carbon-based electrode from the carbon material.

16. The method of claim 15 wherein the polymer employed in the step of precipitating a polymer is selected from the group consisting of polyacrylonitrile, polymethylacrylonitrile, and copolymers including these polymers.

17. The method of claim 15 wherein the primary solvent employed in the step of precipitating a polymer is selected from a group consisting of dimethyl sulfoxide, dimethylformamide, and combinations thereof.

18. The method of claim 15 wherein the polymer employed in the step of precipitating the polymer is polyacrylonitrile or polymethylacrylonitrile and wherein the primary solvent employed in the step of precipitating a polymer is dimethyl sulfoxide or dimethyl formamide.

19. The method of claim 18 further comprising a step of heating the solution of the polymer in the primary solvent to a temperature of between about 100° and the boiling point of the solvent.

20. The method of claim 19 further comprising a step of cooling the solution of the polymer in the primary solvent conducted after said step of heating the solution, wherein said step of cooling the solution cools the solution to a temperature of between about 20° and 60° C.

21. The method of claim 15 wherein the primary solvent is dimethyl formamide or dimethyl sulfoxide and the secondary solvent is water, methanol, acetone, ethanol, methyl ethyl ketone, and combinations thereof.

22. The method of claim 15 wherein the step of pyrolyzing the precipitated polymer is conducted at a temperature of between about 600° and 1200° C.

23. The method of claim 15 further comprising a step of doping the precipitated polymer before the step of pyrolyzing, the step of doping including contacting the precipitated polymer with a phosphorous precursor.

24. The method of claim 23 wherein the step of doping is conducted by contacting the precipitated polymer with a solution including the phosphorous precursor and said secondary solvent.

25. The method of claim 23 wherein the step of doping includes the following steps:

(a) immersing the precipitated polymer in a solution of said phosphorous precursor after the step of removing the secondary solvent from the precipitated polymer; and (b) drying the polymer.

26. A carbon-based electrode for an electrochemical energy storage cell prepared by a method comprising the following steps:

precipitating a polymer from a solution of the polymer in a primary solvent, the precipitated polymer having a fractious morphology which fractious morphology has fracture lines or gaps directed at multiple angles;

exchanging the primary solvent in the pores of the precipitated polymer with a secondary solvent, wherein the secondary solvent is miscible in the primary solvent, and wherein the polymer is substantially insoluble in a solution of the primary and secondary solvents;

removing the secondary solvent from the precipitated polymer;

pyrolyzing the precipitated polymer to convert the polymer to a carbon material having the fractious morphology; and fabricating said carbon-based electrode from the carbon material.

27. The carbon-based electrode of claim 26 wherein the carbon structure produced by the step of pyrolyzing maintains the at least partially fractious morphology of the precipitated polymer.

28. The carbon-based electrode of claim 26 wherein the polymer employed in the step of precipitating a polymer is selected from the group consisting of polyacrylonitrile, polymethylacrylonitrile, and copolymers including these polymers.

29. The carbon-based electrode of claim 26 wherein the primary solvent employed in the step of precipitating a polymer is selected from a group consisting of dimethyl sulfoxide, dimethylformamide, and combinations thereof.

30. The carbon-based electrode of claim 26 wherein the step of precipitating a polymer is performed by contacting the solution with said secondary solvent.

31. The carbon-based electrode of claim 26 wherein the primary solvent is dimethyl formamide or dimethyl sulfoxide and the secondary solvent is water, and wherein the polymer is substantially insoluble in water.

32. The carbon-based electrode of claim 26 wherein the step of pyrolyzing the precipitated polymer is conducted at a temperature of between about 600° and 1200° C.

33. The carbon-based electrode of claim 26 further comprising a phosphorous dopant.

* * * * *